Nov. 18, 1947.  L. V. MEADOR ET AL  2,431,269
TAPERED BORING ATTACHMENT
Filed May 2, 1945  4 Sheets-Sheet 2
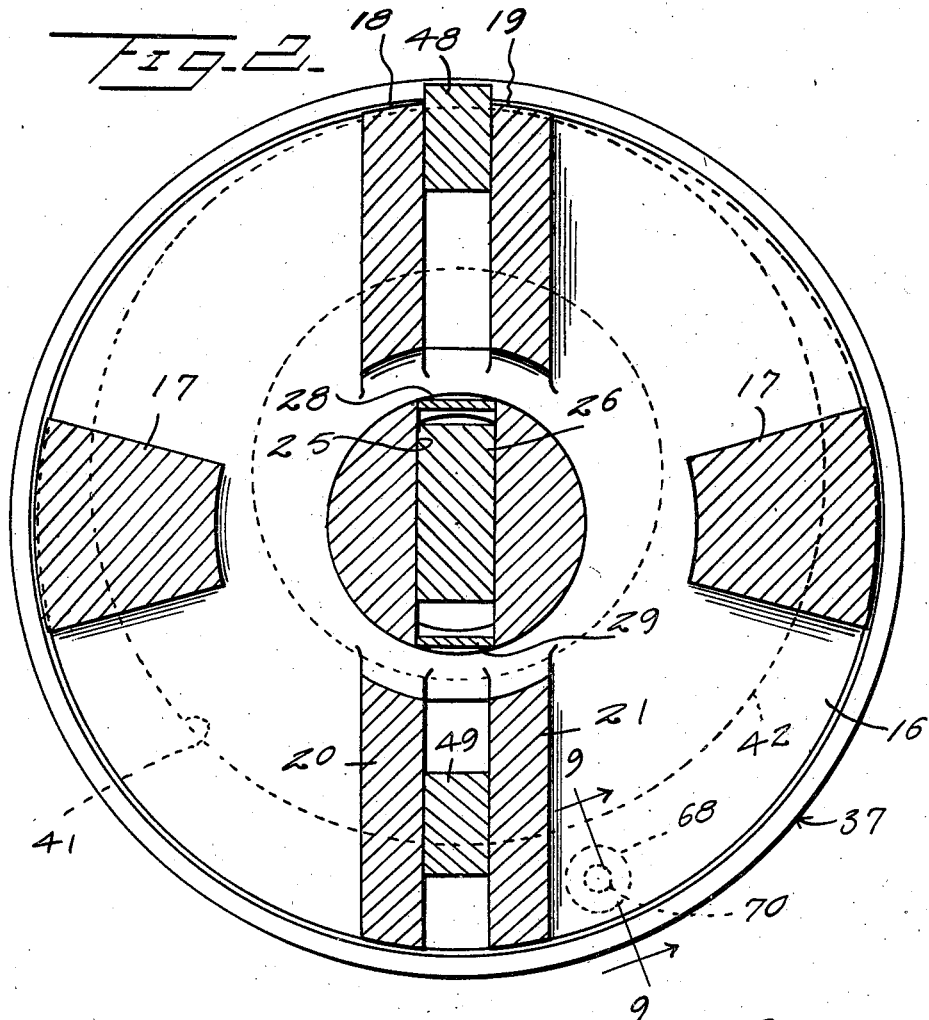
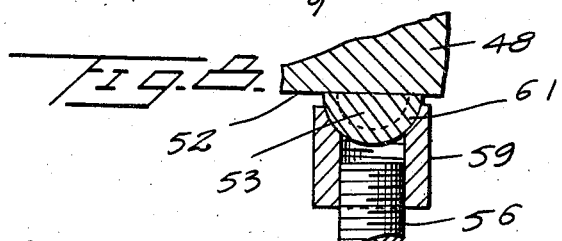
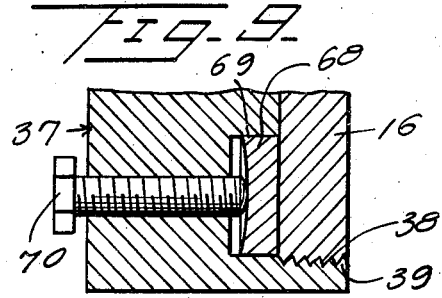
INVENTORS
L. V. Meador
R. J. McDaniel
By Kimmel & Crowell Attys.

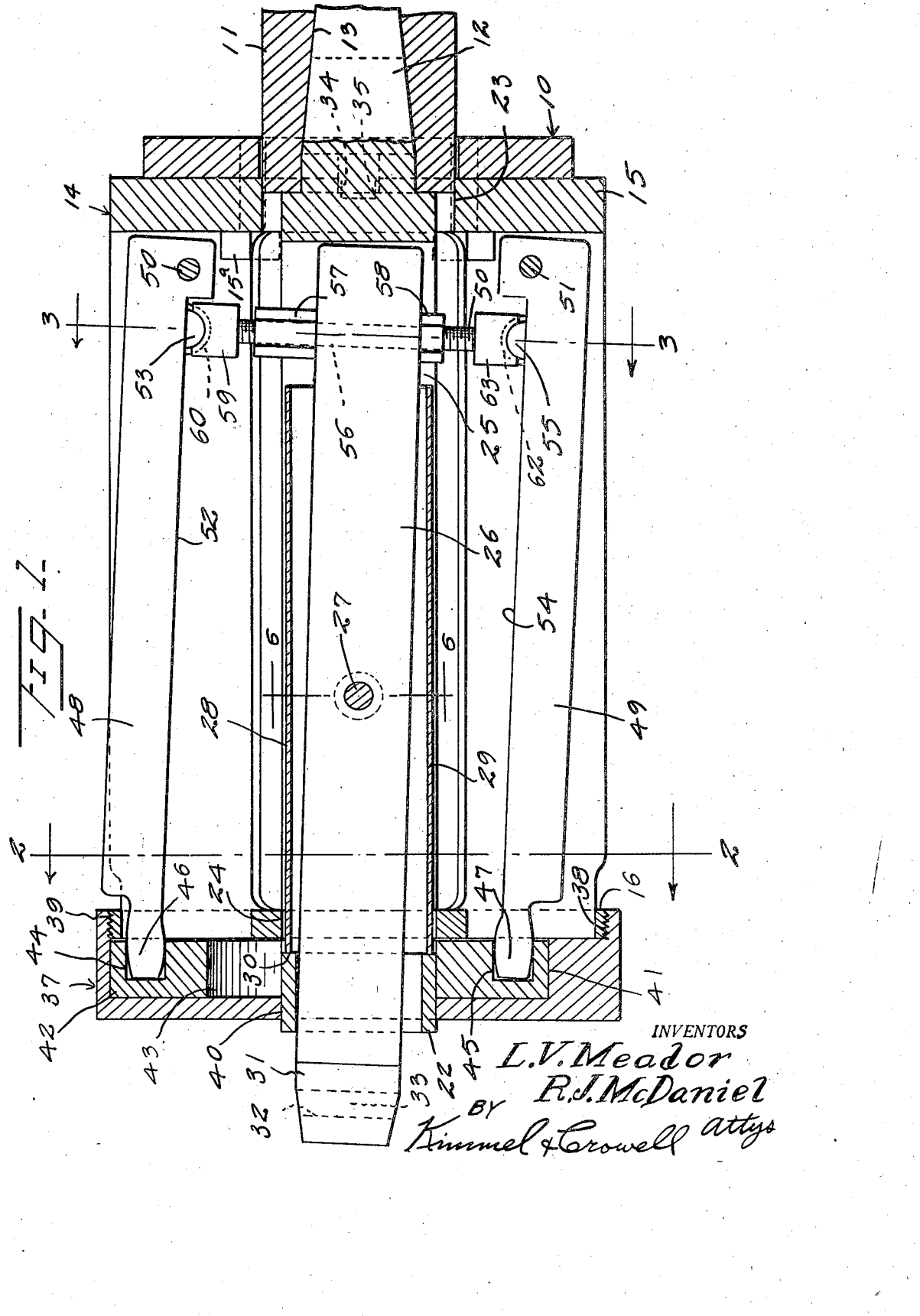

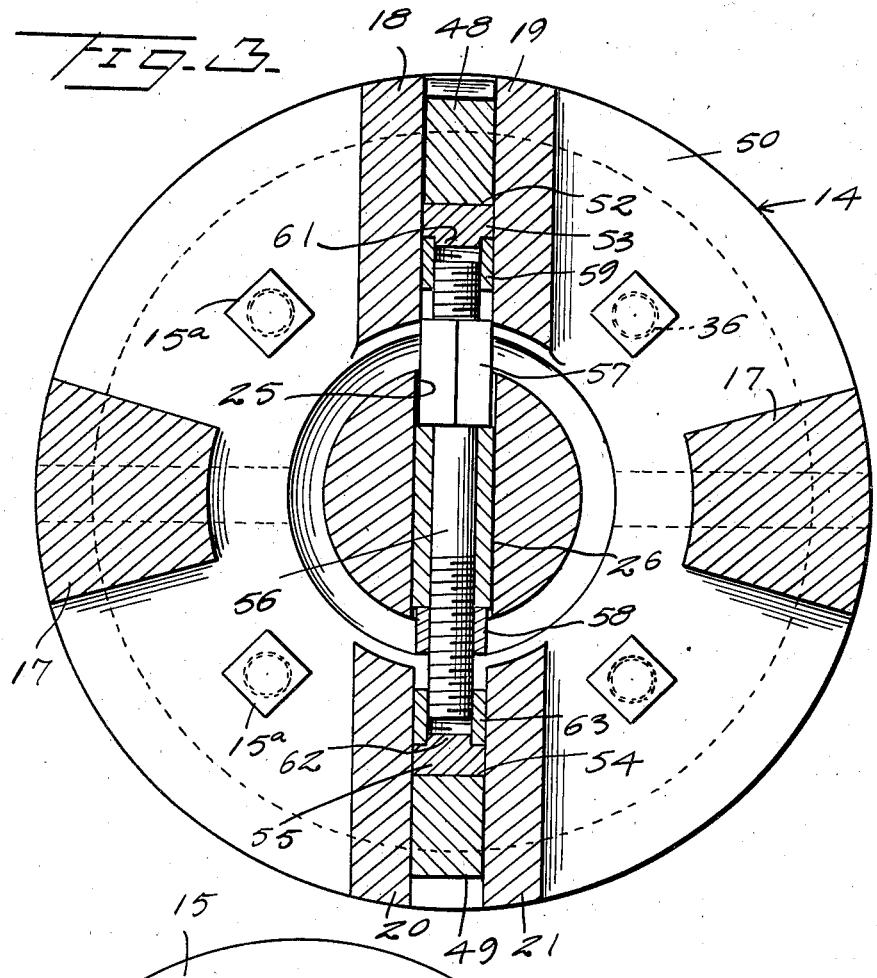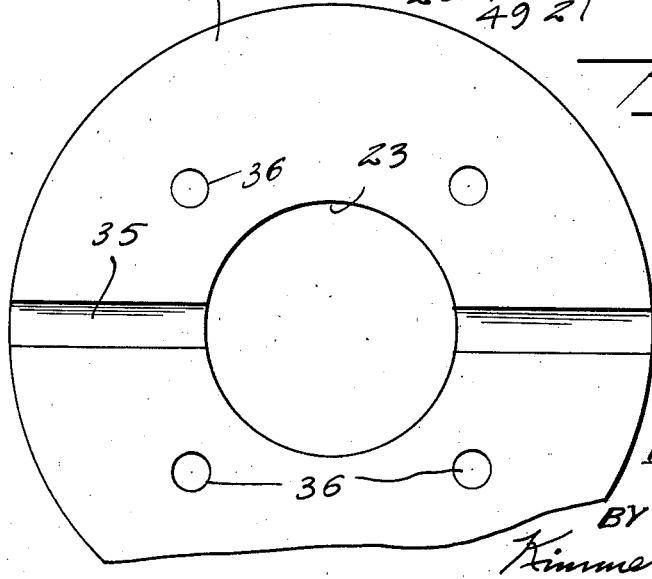

Nov. 18, 1947.   L. V. MEADOR ET AL   2,431,269
TAPERED BORING ATTACHMENT
Filed May 2, 1945                 4 Sheets-Sheet 4
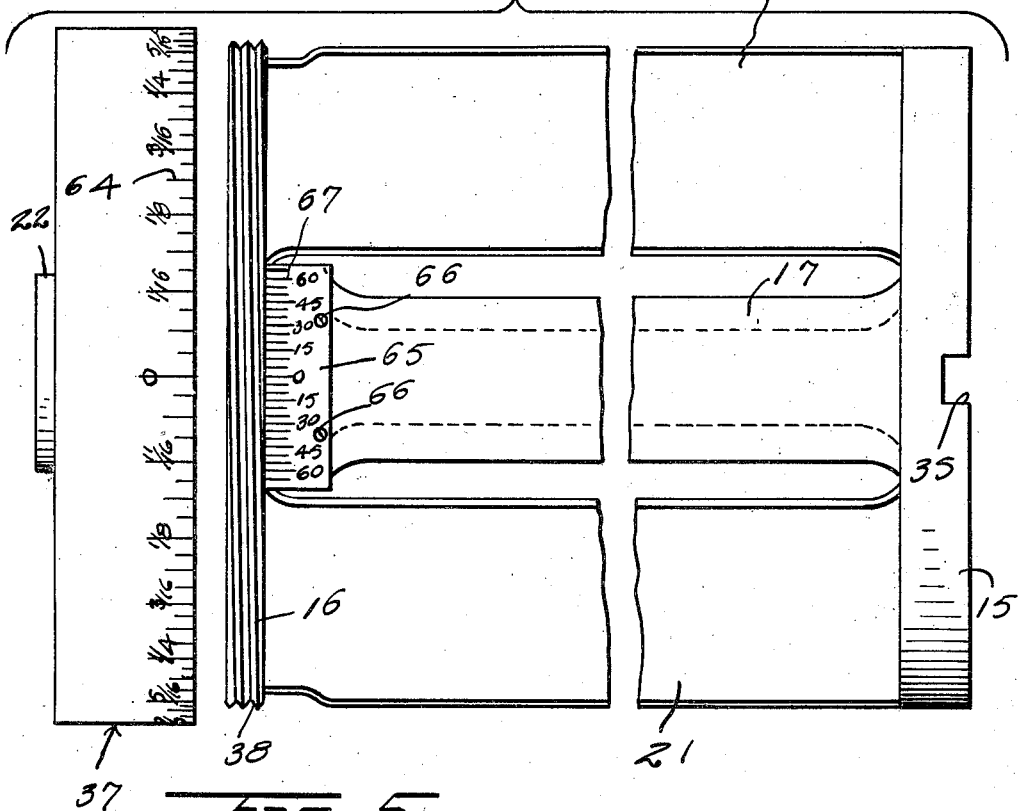
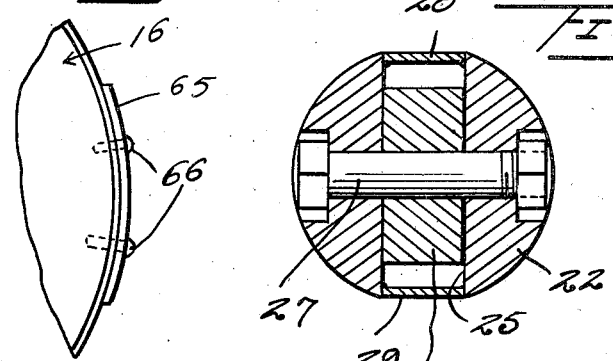
INVENTORS
L. V. Meador
R. J. McDaniel
BY Kinnel & Crowell attys.

Patented Nov. 18, 1947

2,431,269

UNITED STATES PATENT OFFICE 2,431,269

TAPERED BORING ATTACHMENT

Louis V. Meador and Roy J. McDaniel, Vinton, Va.

Application May 2, 1945, Serial No. 591,538

8 Claims. (Cl. 77—58)

This invention relates to boring tools for boring tapered bores.

An object of this invention is to provide a tool in the form of an attachment for a boring machine either vertical or horizontal, which will make it possible to bore tapered holes with any selected taper.

Another object of this invention is to provide a device of this kind which can be very finely adjusted so as to form a precision cut opening and eliminate the necessity of subsequent reaming or other smoothing operation.

A further object of this invention is to provide an attachment of this kind which includes a frame or cage for attachment to the rotating face plate of the boring mill, the cage including adjustable guide means which is engageable by a tool holder so that as the tool holder is moved lengthwise through the rotating cage the tool holder will travel on an angle to the line of travel of the spindle.

A further object of this invention is to provide an eccentric adjusting ring for the tool holder guides which is adjustably carried by the cage so that the degree of taper can be finely regulated, and if desired the tool holder can be adjusted to cut only a straight hole.

A further object of this invention is to provide a tapered bore attachment of this kind which is simple in construction so that it can be sturdily made and will provide for the accurate cutting of the desired size of bore which may be either straight or tapered and will permit the boring of the hole from either end.

To the foregoing objects and others which may hereinafter more fully appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a longitudinal section partly broken away of a tapered boring attachment constructed according to an embodiment of this invention, Figure 2 is a sectional view taken on the line 2—2 of Figure 1, Figure 3 is a sectional view taken on the line 3—3 of Figure 1, Figure 4 is an exploded side elevation partly broken away of the device, Figure 5 is a fragmentary end elevation of the inner cage member showing the cage plate, Figure 6 is a sectional view taken on the line 6—6 of Figure 1, Figure 7 is a fragmentary rear elevation of the device, Figure 8 is a fragmentary sectional view showing one of the tool holder bar mountings, and Figure 9 is a sectional view taken on the line 9—9 of Figure 2.

Referring to the drawings the numeral 10 designates generally a face plate which is secured to a rotatable boring mill construction and has movable endwise therethrough a spindle 11. The spindle 11 is provided with a tapered socket 13 within which the inner or rear end of a shank 12 is adapted to be firmly secured.

In order to provide a means whereby a tool which is operatively connected with the spindle 11 will form a tapered bore, I have provided a cage or frame structure, generally designated as 14, which is adapted to be secured by fastening members 15a to the face plate 10. The cage or frame 14 comprises a rear annular plate 15, a forward annular plate 16, and an opposed pair of connecting bars 17. The connecting bar 17 may be cast with or welded to the plates 15 and 16 so that the forward plate 16 will be rigidly supported in a position coaxial with the face plate 10. The cage 14 also includes a pair of spaced apart parallel bars 18 and 19 and a second pair of spaced apart parallel bars 20 and 21. The pairs of bars 18 and 19 and 20 and 21 are diametrically disposed. An endwise movable spindle 11 is slidably mounted through a central opening 23 formed in the plate 15 and shaft 22 is slidable in a central opening 24 which is formed in the plate 16.

The shaft 22 has the tapered shank 12 extending from the rear end thereof and is adapted to be non-rotatable with respect to the spindle or socket member 11. The shaft 22 has formed therein a lengthwise extending slot 25 within which a tool holding bar or member 26 is rockably mounted. The bar 26 is rockably carried by a pivot bolt or member 27 extending diametrically through the shaft 23 at a point between the ends of the shaft and preferably the pivot member 27 is positioned at a point in substantially the transverse median of the bar 26. A pair of elongated guard plates or strips 28 and 29 are disposed in the slot 25 being welded, or otherwise firmly secured, in the outer longitudinal edges of the slot 25 and providing means for preventing cuttings or other material from entering the slot 25. The slot 25 terminates at its forward end at a point rearwardly from the forward end of the shaft 22 as indicated at 30, so as to provide a smooth unbroken peripheral surface for the forward end of the shaft 22. The tool holding bar 26 is provided at its forward end with a head 31 having an opening 32 therein, within which a cutting tool is adapted to be positioned and firmly secured by means of a set-screw 33. As shown in Figure 1, the face plate 10 is provided with a diametric key 34 which is adapted to engage in a keyway 35 formed in the rear or inner side of the rear plate 15. The rear plate 15 may be formed with a plurality of threaded openings 36 for receiving the securing members 15ª.

A cap, generally designated as 37, is adjustably mounted on the forward plate 16, the latter being formed with peripheral threads 38 and the cap 37 being formed with interior threads 39 engaging the threads 38. The cap 37 is provided with a central opening 40 through which the forward end of the shaft 22 slidably engages. The cap 37 also includes an eccentrically disposed annular socket or recess 41 within which a disk or plate 42 is loosely mounted. The plate 42 is provided with a relatively large central opening 43 through which the shaft 22 loosely engages. The plate 42 is provided in its inner or rear face with a pair of recesses 44 and 45, within which the forward reduced ends 46 and 47 of a pair of elongated guide bars 48 and 49 respectively are adapted to rockably engage. The guide bar 48 loosely engages between the cage bars 18 and 19 and has extending through the rear end portion thereof, a pivot bolt 50 which extends through the two cage bars 18 and 19. The guide bar 49 is pivotally mounted between the cage bars 20 and 21 being pivotally mounted at its rear end on a pivot bolt 51 extending between the cage bars 20 and 21. The inner edge 52 of the guide bar 48 constitutes a guide or track with which a shoe 53 slidably engages.

The inner edge 54 of the guide bar 49 constitutes a gide or track with which a second shoe 55 slidably engages. The two guiding surfaces or edges 52 and 54 are adapted to be disposed in parallelism at all times so that the two shoes 53 and 55 may freely slide along these guide surfaces. A bolt 56 is extended through the rear end portion of the tool holding bar 26 being formed with a rib 57 between the ends thereof engaging one edge of the tool holding bar 26, and a nut 58 is threaded on the bolt 56 and firmly holds this bolt in the rear end of the tool holding bar 26. A socket member 59 is threaded on one end of the bolt 56 being provided with a concave socket 60 in its outer end within which the substantially semi-circular inner face of the shoe 53 is adapted to rockably engage. The shoe 53 is formed with a substantially semi-circular rib 61 engaging in the socket member 59 so that the shoe 53 will be held against lateral movement with respect to the socket member 59.

The shoe 55 is provided with a substantially semi-circular inner surface and is also formed with a substantially semi-circular rib 62 which engages within a socket member 63 threaded on the adjacent end of the bolt 56. The peripheral surface of the cap member 37 is formed with graduations 64 and a calibrating plate 65 of segmental configuration is secured by fastening members 66 to one of the cage bars 17. The graduations 67 on the plate 65 are adapted to be correlated with the graduations 64 on the cap 37 so as to provide a very fine adjusting means for adjusting the eccentric socket 41 and thereby adjusting the guide bar supporting plate 42 with respect to the axial center of the shaft 22.

In the use and operation of this attachment, the cage 14 is secured by fastening members 15ª or the like to the face plate 10 of the boring machine. The boring machine may be of the horizontal or vertical type. The tapered shank 12 is secured within the tapered socket 13 of the spindle 11 and a suitable cutting tool is secured by the set-screw 33 in the tool opening 32 of the cutter bar 26. The cap 37 is rotatably adjusted with respect to the forward plate 16, so as to position the guide bar supporting plate 42 in the desired position with respect to the axial center of the shaft 22. The exact position of the eccentric socket 41 and the plate 42 may be determined by the correlated graduations 64 and 67. After the cap 37 has been rotatably adjusted to the desired position, it may be locked in its adjusted position by means of a locking plug 68, which is loosely mounted in a socket 69 carried by the cap member 37. A set-screw or plug locking and releasing member 70 is threaded into the cap 37 and bears against the inner end of the plug 68. The rear end of the plug 68 bears against the forward side of the forward plate 16.

When the cap 37 has been properly adjusted the boring machine may be operated in the usual manner and at this time the spindle 11 will move endwise with respect to the cage 14. Endwise movement of the spindle 11 will move the shaft 22 to the left as viewed in Figure 1 and as the shaft 22 moves outwardly the boring bar 26 will be rocked on pivot 27 as the shoes 53 and 55 slide forwardly over the guide surfaces 52 and 54. As the guide surfaces 52 and 54 are disposed on an angle with respect to the longitudinal axis of the shaft 22, the tool holder 26 will be rocked so that the forward cutting end thereof will form a tapered bore as the shaft 22 moves forwardly on its cutting cycle.

This device has been designed as an attachment for a conventional boring mill or machine and in actual practice has been found to cut a tapered bore accurately and in a manner to eliminate the subsequent reaming of the bore.

What we claim is:

1. A taper boring attachment for a boring machine having a rotatable face plate and a rotatable and endwise movable spindle, comprising a cage for attachment to and rotation with said face plate, said cage comprising a pair of spaced apart plates, a plurality of bars fixedly connecting said plates together, a shaft loosely engaging axially through said plates and adapted to be secured to said spindle for rotation and endwise movement therewith, a tool holder rockably carried by said shaft and extending lengthwise thereof, a pair of guide bars carried by said cage lengthwise thereof and disposed at an angle to the longitudinal axis of said shaft, and means carried by said tool holder engageable with said guide bars whereby to effect rocking of said tool holder simultaneously with the endwise movement of said shaft.

2. A taper boring attachment as set forth in claim 1 including means pivotally securing one end of each bar to said cage member, and means rotatably adjustable relative to said cage member supporting the opposite ends of said bars.

3. A taper boring attachment as set forth in claim 1 including means pivotally securing one end of each bar to said cage member, and means carried by one of said pair of plates and circumferentially adjustable relative thereto supporting the opposite ends of said bars.

4. A boring attachment as set forth in claim 1 including means pivotally securing one end of each bar to said cage member, a circumferentially adjustable cap carried by one of said plates, said cap having an eccentrically disposed recess therein, a bar adjusting plate loosely engaging in said recess and formed with means rockably supporting the opposite ends of said bars, circumferential adjustment of said cap effecting angular adjustment of said bars.

5. A boring attachment as set forth in claim 1 including means pivotally securing one end of each bar to said cage member, a circumferentially adjustable cap carried by one of said plates, said cap having an eccentrically disposed recess therein, a bar adjusting plate loosely engaging in said recess and formed with means rockably supporting the opposite ends of said bars, circumferentially adjustment of said cap effecting angular adjustment of said bars, and a stop member adjustably carried by said cap for limiting the adjustment thereof in at least one direction.

6. A boring attachment as set forth in claim 1 including means pivotally securing one end of each bar to said cage member, a circumferentially adjustable cap carried by one of said plates, said cap having an eccentrically disposed recess therein, a bar adjusting plate loosely engaging in said recess and formed with means rockably supporting the opposite ends of said bars, circumferential adjustment of said cap effecting angular adjustment of said bars, and correlated graduations carried by said cap and said cage member whereby said cap may be finely adjusted.

7. A taper boring attachment for a boring machine having a rotatable face plate and a rotatable and endwise movable spindle, comprising a cage for attachment to and rotation with said face plate, a shaft loosely engaging through said cage and adapted to be secured to said spindle for rotation and endwise movement therewith, a tool holder rockably carried by said shaft and extending lengthwise thereof, guide bars carried by said cage lengthwise thereof and disposed at an angle to the longitudinal axis of said shaft, means carried by said tool holder engageable with said guide bars whereby to effect rocking of said tool holder simultaneously with the endwise movement of said shaft, and correlated means carried by said guide bars and said cage for selectively varying the angle of said guide bars.

8. A taper boring attachment for a boring machine having a rotatable face plate and a rotatable and endwise movable spindle comprising a cage for attachment to and rotation with said face plate, a shaft loosely engaging through said cage and adapted to be secured to said spindle for rotation and endwise movement therewith, a tool holder rockably carried by said shaft, guide means rockably carried by said cage lengthwise thereof and disposed at an angle to the longitudinal axis of said shaft, means carried by said tool holder engageable with said guide means to effect rocking of said tool holder upon endwise movement of said shaft, and means carried by said cage engageable with said guide means for selectively varying the angle of said guide means.

LOUIS V. MEADOR.
ROY J. McDANIEL.

REFERENCES CITED

The following references are of record in the file of this patent:

UNITED STATES PATENTS

| Number | Name | Date |
|---|---|---|
| 1,989,227 | Craley | Jan. 29, 1935 |
| 1,878,175 | Oyen | Sept. 20, 1932 |